United States Patent [19]
Kondratiev et al.

[11] Patent Number: 5,590,413
[45] Date of Patent: Dec. 31, 1996

[54] RADIO TRANSCEIVER HAVING SHARED MODULATION AND DEMODULATION MIXER CIRCUITS

[75] Inventors: Victor K. Kondratiev; Valery P. Kouplitchenko, both of Moscow; Alexander V. Galitsky, Moscow-Zelenograd, all of Russian Federation; Geoffrey G. Baehr, Palo Alto, Calif.

[73] Assignee: Sun Microsystems, Inc., Mountain View, Calif.

[21] Appl. No.: 181,329

[22] Filed: Jan. 14, 1994

[51] Int. Cl.⁶ .................................................. H04B 1/44
[52] U.S. Cl. ........................... 455/86; 455/84; 375/334
[58] Field of Search .................................... 455/78, 79, 82, 455/83, 84, 85, 86, 207–209, 303, 304, 305, 306, 313, 314, 89; 375/259, 260, 272, 334

[56] References Cited

U.S. PATENT DOCUMENTS 3,909,527  9/1975  Ohta et al. .............................. 375/259
5,373,300  12/1994  Jenness et al. ........................... 455/89

FOREIGN PATENT DOCUMENTS 405129984  5/1993  Japan ...................................... 455/89

OTHER PUBLICATIONS

"High Speed Continuous–Phase FSK Modulation and Demodulation System" by Morihino et al 1980.

*Primary Examiner*—Reinhard J. Eisenzopf
*Assistant Examiner*—Thanh Le
*Attorney, Agent, or Firm*—Timothy J. Crean; James W. Rose

[57] ABSTRACT

A radio transceiver including an antenna for transmitting and receiving radio signals, a reception section for selecting a received carrier signal, a transmission amplifier section for amplifying signals to be broadcast, a mixer, coupled between the reception section and the transmission section, a variable frequency generator for generating local frequencies for the mixer, and a first (synphase) quadrature demodulating channel and a second (square) channel demodulating channel. The mixer includes a first switch, a first double balanced (DB) mixer, intermediate frequency (IF) filter, IF amplifier, power divider, and a second DB mixer. These components are used during both transmission and reception by the radio transceiver.

18 Claims, 3 Drawing Sheets

RADIO TRANSCEIVER HAVING SHARED MODULATION AND DEMODULATION MIXER CIRCUITS

BACKGROUND OF THE INVENTION

1. Field of the Invention

The present invention relates to spread spectrum radio communication systems, and more particularly, to a radio transceiver for wireless network communication between mobile and/or stationary computers.

2. Description of the Prior Art

Wireless computer communication, commonly referred to as "wireless networking", represents the merging of radio technology and networking technology. Wireless communication permits a mobile/stationary computer to transfer information, in accordance with a predefined networking protocol, to another mobile/stationary computer via a radio medium. The mobile wireless networking environment presents many technical challenges. Mobile computers are limited in size, power, and tend to be used in remote locations. Each of these factors greatly complicates the radio design of the mobile computer.

The standard radio transceiver includes a receiver and a transmitter. The transmitter is responsible for modulating a baseband signal onto a carrier frequency signal during transmission. Modulation is the modification of the high frequency carrier signal to include the relatively low frequency baseband signal. The receiver is responsible for retrieving the baseband signal, and hence recovering the transmitted information, from the carrier signal during reception. A single antenna is typically shared between the receiver and transmitter of the transceiver. A switch or circulator is used to, in effect, share the operation of the antenna between reception and transmission.

Standard transceiver design typically includes a separate transmitter and a separate receiver. The transmitter includes a first set of dedicated filters, mixers and amplifiers and the receiver includes a second set of dedicated filters, mixers and amplifiers. Filters, mixers, or amplifiers are typically not shared between the receiver and the transmitter.

The standard transceiver design has many disadvantages when used in the mobile computing environment. The component parts required to implement the separate receiver and the transmitter are numerous, cumbersome and difficult to lay out on a circuit board in a space efficient manner. As a result, the boards tend to be relatively large, heavy, consume a significant amount of the battery power, and are difficult to install into a mobile computer, where space, light weight, and battery power are at a premium. The large number of component parts required to implement the standard transceiver in a mobile computer is expensive, reduces reliability, and increases manufacturing complexity.

SUMMARY OF THE INVENTION

The present invention provides a spread spectrum radio transceiver of a simplified design with fewer component parts than prior art radio transceivers.

The transceiver of the present invention includes an antenna for transmitting and receiving radio signals, a reception section, a transmission amplifier section, a mixer coupled between the reception section and the transmission amplifier section, a variable frequency generator (VFG) for generating local oscillator (LO) signals for the mixer, a synphase demodulating channel, a square demodulating channel, and a phase comparator. The mixer includes a first double balanced (DB) mixer, intermediate frequency (IF) filter, IF amplifier, power divider, and a second DB mixer. The mixer components may be used during both transmission and reception of the transceiver.

During transmission, the first DB mixer of the mixer modulates a coded baseband signal with a carrier signal generated by the VFG. Thereafter, the coded, modulated carrier signal is passed through the IF filter and the IF amplifier and provided to the second DB mixer. The second DB mixer up-converts the coded, modulated, filtered and amplified carrier signal to a desired broadcast frequency. The carrier signal is then provided to the transmission amplification section for amplification, to a broadcast level, and finally to the antenna for broadcasting.

During reception, the reception section of the transceiver selects and filters a desired UHF carrier signal from the radio signals received at the antenna. The UHF carrier signal is provided to the mixer, where the first DB mixer down-converts the UHF carrier signal to an IF signal with a first LO signal, and the IF carrier signal is subsequently filtered and amplified by the IF filter and IF amplifier respectively. The power divider divides the IF carrier signal into two equivalent IF carrier signals and provides the two signals to the first DB mixer and the second DB mixer respectively. The first DB mixer further down converts the first IF carrier signal with a second LO signal, generating a first LF carrier signal. Similarly, the second DB mixer down-converts the second IF signal with a third LO signal generating a second LF carrier signal. The the second and third LO signals used by the first DB mixer and the second DB mixer respectively are of the same frequency, but the third LO signal is shifted ninety degrees (90°) out of phase with the second LO signal.

The mixer then provides the first LF carrier signal to the synphase demodulation channel and the second LF carrier signal to the square demodulation channel. The two demodulation channels recover a first baseband signal and a second baseband signal respectively. The first baseband signal is identical to the second baseband signal, except the second signal is ninety degrees (90°) out of phase with the first signal. The phase comparator compares the first baseband signal and the second baseband signal using the system clock as a phase reference, thereby retrieving the original coded baseband signal transmitted to the receiving radio.

The transceiver radio design of the present invention provides numerous novel features. The radio design uses the same mixers, amplifiers and falters for both transmit and receive. In the receive mode, the first DB mixer performs two mixings at the same time (UHF to IF and IF to LF), thus eliminating the need for yet another component mixer. The radio design also provides a unique transmission-reception protocol. During transmission, a single baseband signal is transmitted on the carrier signal. During reception, quadrature signals of the baseband signal are created, and then subsequently phase compared using the system clock as a phase reference. This procedure recognizes and removes random phase shifts introduced into the system, and renders an otherwise non-coherent system "quasi coherent".

The transceiver of the present invention provides many advantages, particularly when used in the mobile computing environment. The number of component parts required to implement the transceiver is significantly reduced, making the task of board layout easier and less cumbersome. The resulting boards tend to be lighter: and more space efficient. The reduced number of components consume relatively less battery power, is less expensive, more reliable, and simplifies manufacturing relative to prior art radio designs.

DESCRIPTION OF THE DRAWINGS

The objects, features and advantages of the system of the present invention will be apparent from the following description in which.

DESCRIPTION OF THE PREFERRED EMBODIMENT

Figure 1:
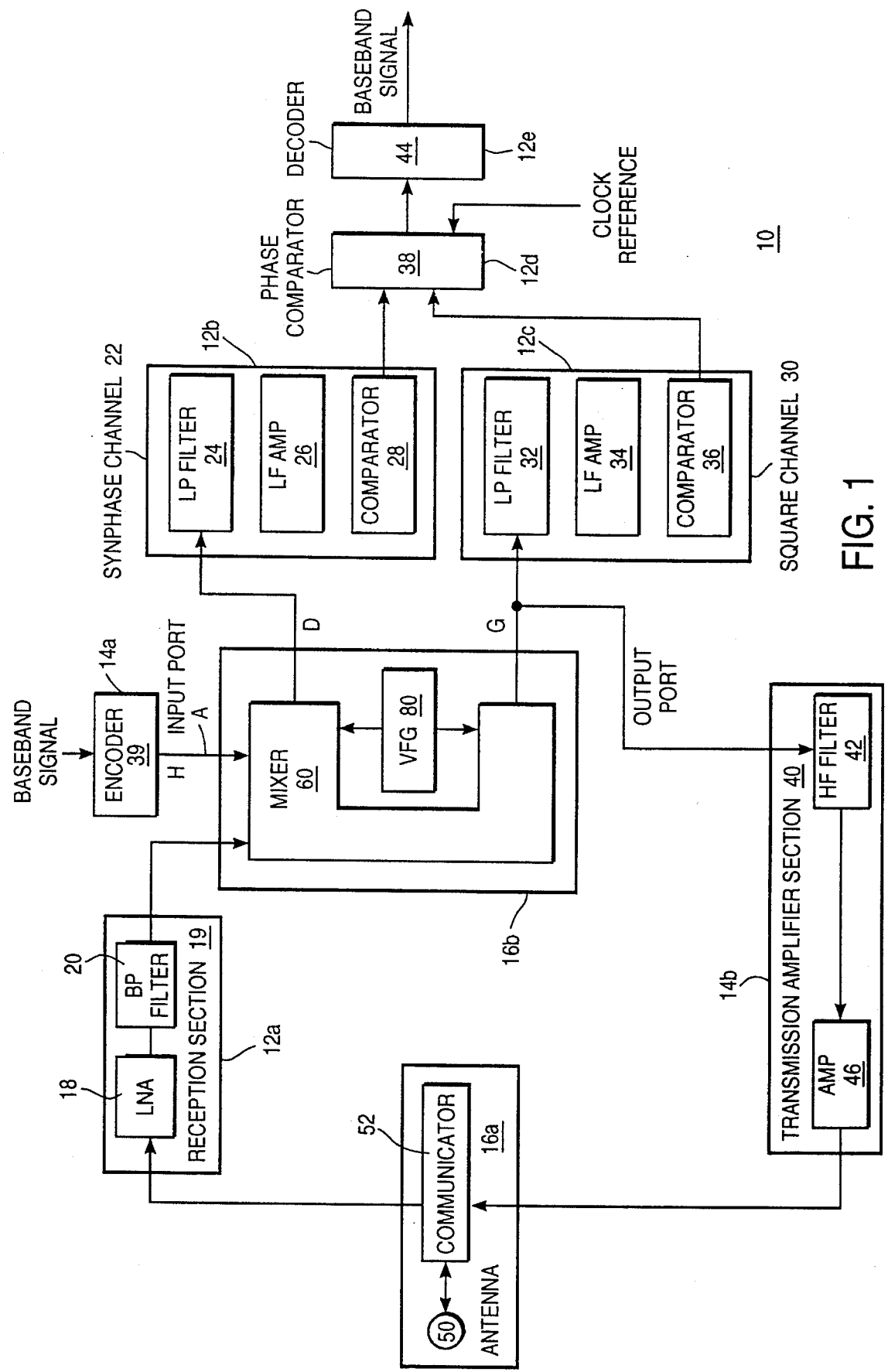
FIG. 1 is a block diagram of a transceiver according to one embodiment of the present invention.

Referring to FIG. 1, a block diagram of the spread spectrum radio transceiver 10 of the present invention is shown. The component parts of the transceiver 10 are divided into three types of blocks. The blocks designated by reference designators; $12_{(a-e)}$ contain components primarily used by the receiver function of transceiver 10. The blocks designated by reference designators $14_{(a-b)}$ contain components primarily used by the transmitter function of the transceiver 10. The blocks designated by reference designators $16_{(a-b)}$ contain components which are used by both the receiver function and transmitter function of the transceiver 10.

Block $12_a$, labelled Reception Section 19, includes low noise amplifier (LNA) 18 and BP (band pass) Filter 20. Block $12_b$, labelled Synphase Channel 22, includes a LP (low pass) Filter 24, LF Amplifier 26, and Comparator 28. Block $12_c$, labelled Square Channel 30, includes LP Filter 32, LF Amplifier 34, and Comparator 36. Block $12_d$ contains a Phase Comparator circuit 38. Block $12_e$ contains a Decoder circuit 44. The block $14_a$ includes Encoder 39. The block $14_b$, labelled the Transmission Amplifier Section 40, includes BP Filter 42, and Amplifier 46. The block $16_a$ includes Antenna 50 and Communicator 52. The block $16_b$ includes Mixer 60 and Variable Frequency Generator (VFG) 80.

Figure 2:
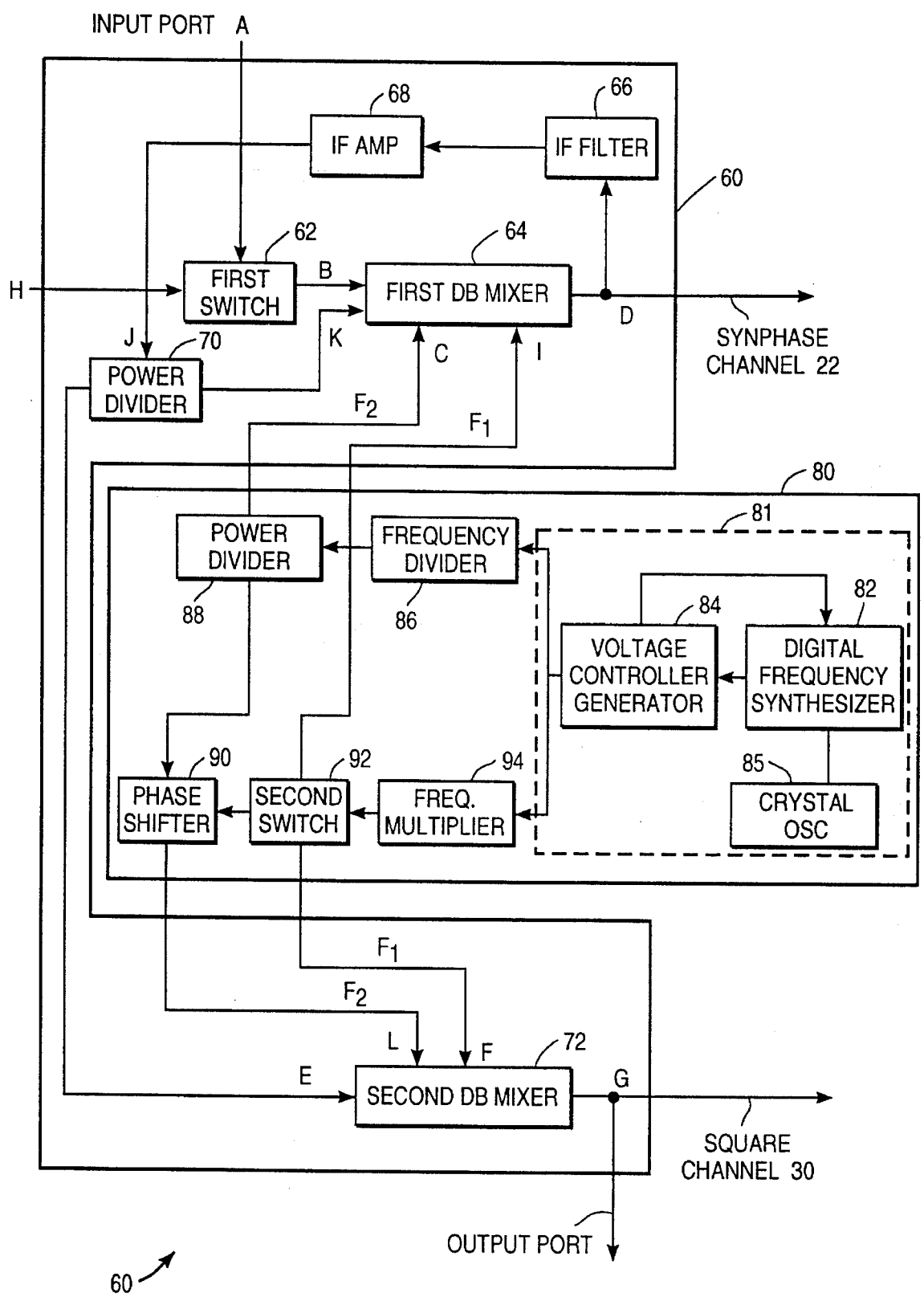
FIG. 2 is a detailed block diagram of a mixer circuit and a variable frequency generator circuit used in the transceiver of FIG. 1.

Referring to FIG. 2, a block diagram of the Mixer 60 and VFG 80 according to one embodiment of the present invention is shown. The Mixer 60 includes a First Switch 62, a First Double Balanced (DB) Mixer 64, IF Filter 66, IF Amplifier 68, Power Divider 70, and Second DB Mixer 72. The VFG 80 includes a phase lock loop (PLL) 81 including a Digital Frequency Synthesizer 82, Voltage Controlled Generator 84, and a Crystal Oscillator 85, Frequency Divider 86, Power Divider 88, Phase Shifter 90, Second Switch 92 and Frequency Multiplier 94.

The IAM-81008 Active Double Balance Mixer/IF Amplifier, by Hewlett Packard, Palo Alto, Calif., is recommended for the First DB mixer 64 and second DB Mixer 72. The First Switch 62 and Second Switch 92 are preferably PIN diode switches. In the preferred embodiment, the Phase Shifter 90 is a standard inductive-capacitive bridge phase shifting circuit, constructed using discrete components. The Phase Shifter 90 maintains its accuracy within five degrees (5°) across the frequency range (266–276 MHz) of $F_2$.

The VFG 80 is responsible for generating the various local oscillator (LO) signals required for modulation and down conversion performed by the mixer 60. This is accomplished by the PLL 81 which generates a stable reference frequency. The Frequency Multiplier 94 doubles the reference frequency to generate a first LO signal ($F_1$). The Frequency Divider 86 divides the reference frequency by four to generate a second LO signal ($F_2$).

OPERATION

The transceiver 10 has two modes of operation, transmit and receive. The operation of the various component parts during transmit and receive are described below. In accordance with the preferred embodiment of the present invention, the transceiver 10 is intended to transmit and receive frequencies in the range of 2.4 GHz to 2.4883 GHz.

A. Transmit Mode

As best illustrated in FIG. 1, the baseband signal is coded by Encoder 39 which performs non-return to zero (NRZ) encoding during the transmit mode. The baseband signal can be received from any device such as an output port of a computer. According to various embodiments of the present invention, other well known baseband encoding schemes can be used.

As best illustrated in FIG. 2, the coded baseband signal is provided to the mixer 60 through the Input Port (node A). The First Switch 62 directs the coded baseband signal to the first input (node B) of the First DB Mixer 64. The First DB Mixer 64 performs a binary phase shift key (BPSK) modulation of the coded baseband signal onto a carrier signal. This is accomplished by mixing the coded baseband signal (node B) with $F_2$ (node C). With BPSK modulation, the phase of the carrier signal is altered according to the coded binary value of the baseband signal. For example, the phase of a carrier signal modulated by a coded binary one pulse is 180° degrees out of phase with a carrier signal modulated by a coded binary zero pulse. According to various embodiments of the present invention, other well known modulation schemes can be used.

The IF Filter 66 is tuned to pass IF components of the frequency spectrum generated at the output (node D) of the First DB Mixer 64. The IF Amplifier 68 amplifies the coded modulated IF carrier signal (node J). The Second DB Mixer 72 is responsible for up converting of the coded IF carrier signal to the UHF broadcast frequency. This is accomplished by providing the coded IF carrier signal, through the Power Divider 70, to the input (node E) of the Second DB Mixer 72 which mixes the coded, modulated IF carrier signal with $F_1$ (node F). The coded, modulated and up-converted UHF carrier signal is provided at node G at the output of the Mixer 60.

The Transmission Amplifier Section 40 amplifies the UHF carrier signal to the desired broadcast power level. The BP Filter 42 band-limits the UHF components of the frequency spectrum generated by the Mixer 60. The Amplifier 46 amplifies the power of the UHF carrier signal to a desired broadcast level. The UHF carrier signal is thereafter broadcast by the antenna 50 through the communicator 52, which in the preferred embodiment is a PIN diode switch.

For the purpose of further describing the operation of the transceiver 10 during transmission mode, an actual example is provided. Table I below provides the frequencies for the signals that appear at nodes A through G for the example.

TABLE I

| Node | Frequency |
| --- | --- |
| A | 0.01–10 MHz |
| B | 0.01–10 MHz |

TABLE I-continued

| Node | Frequency |
| --- | --- |
| C | 266–276 MHz |
| D | 266–276 MHz |
| E | 266–276 MHz |
| F | 2.128–2.208 GHz |
| G | 2.4–2.483 GHz |

B. Receiving Mode

As best illustrated in FIG. 1, UHF radio signals are received by the antenna 50. The communicator 52 directs the received radio signals to the Reception Section 19 in the reception mode. The LNA 18 amplifies a desired UHF carrier signal. The desired UHF carrier signal passes through the band width of B P Filter 20.

The UHF carrier frequency signal is then provided to the Mixer 60 which performs several functions. First, the mixer down converts the UHF carrier signal to an IF carrier signal. Second, the mixer 60 generates two phase quadrature (90° degrees out of phase) IF carrier signals from the single IF carrier signal. Third, the Mixer 60 down converts the two IF signals to two LF carrier signals which are then applied to the Synphase Channel 22 and the Square Channel 30 respectively.

More specifically, as best illustrated in FIG. 2, the Mixer 60 receives the UHF carrier signal from the Reception Section 19 at node H. The UHF carrier signal, through First Switch 62 (node B) is down converted to the IF range by the first DB mixer 64. This is accomplished by mixing the received UHF carrier signal (node B) with $F_1$ (node I). The frequency of $F_1$ is selected so that the IF signal of interest at the output of first DB mixer 64 (node D) is in the center of the passband of the subsequent IF Filter 66. The IF carrier signal, after amplification by IF Amplifier 68, is provided at the input (node J) of power divider 70.

The Power Divider 70 divides the IF carrier signal (node J) into two identical IF carrier signals of reduced power, and provides the two IF carrier signals to the input of the First DB Mixer 64 (node K) and Second DB Mixer 72 (node E). The First DB Mixer 64 and Second DB Mixer 72 are used to create the first LF quadrature carrier signal and second LF quadrature carrier signals respectively.

For the first quadrature signal, the First DB Mixer 64 is used for down conversion by mixing the IF carrier signal (node K) with $F_2$ (node C). The frequency $F_2$ is selected so that the low frequency LF components of interest at the output of first DB mixer 64 (node D) are below the cut off frequency of the subsequent LP Filter 24 of the Synphase Channel 22.

For the second quadrature signal, the Second DB Mixer 72 is used for down conversion by mixing the second IF carrier signal (node E) with $F_2$ (node L), shifted ninety degrees by Phase Shifter 90. The frequency $F_2$ is selected so that the low frequency LF components of interest at the output of second DB mixer 72 (node G) are below the cut off frequency of the subsequent LP Filter 32 of the Square Channel 30.

As best illustrated in FIG. 1, the first LF quadrature carrier signal is passed through LP Filter 24, LF Amplifier 26 and Comparator 28 of the Synphase Channel 22. The LP Filter 24 passes the LF components of the of the first LF carrier signal. Amplifier 26 amplifies the filtered LF signal. Comparator 28 performs a BPSK demodulation on the LF carrier signal and recovers the coded baseband signal of the first quadrature signal. In a similar manner, the LP Filter 32, LF Amplifier 34 and Comparator 36 of the Square Channel 30 recovers the coded baseband signal of the second quadrature signal.

The first coded baseband signal and the second coded baseband signal are identical except they are ninety degrees (90°) out of phase. The Phase Comparator 38 subsequently compares the two signals using the system clock as a phase reference, thereby retrieving the original coded baseband signal. The Decoder 44 decodes the coded baseband signal, recovering the original baseband signal. The baseband signal is then applied to subsequent circuitry, for example, an input port of a computer. This technique of quadrature demodulation has a significant advantage. Since the radio transmitting the baseband signal and the radio receiving the baseband signal are non-coherent, random phase shifts are introduced into the data stream. The quadrature demodulation allows these random phase shifts to be recognized and removed. The practical effect is to render an otherwise non-coherent system "quasi" coherent.

It is useful to note that the First DB Mixer 64 performs the mixing of the incoming UHF carrier signal with $F_1$ (node B and node I respectively), and simultaneously, the second mixing of the IF carrier signal and $F_2$ (node K and node C respectively). This dual mixing function is accomplished by linearly summing the UHF signal (node B) and the IF signal (node K) at the RF input port (not shown) of the First DB Mixer 64, and linearly summing F1 and F2 at the LO input port (not shown) of the First DB Mixer 64 respectively.

The problems associated with intermodulation are largely avoided by the selection of the bandpass for IF Filter 66 and LP Filter 24 of the Synphase Channel 22. With respect to the first mixing operation, IF components are passed by IF Filter 66. All other frequency components of the output spectrum of the first mixer 64 are suppressed. Similarly, only the low frequency components are passed through the LP Filter 24 with respect to the second mixing operation. The two mixings can occur at the same time without one substantially interfering with the other because of the wide separation between the IF and the LF passbands. Furthermore, the power levels at the RF input and LO input of the First DB Mixer 64 are set low. As a result, the First DB Mixer 64 is typically not driven into the saturation mode, which tends to reduce intermodulation by products.

For the purpose of further describing the operation of the transceiver 10 during receiving mode, an actual example is provided. Table II below provides the actual frequencies for nodes A through K for the example and the power levels at nodes B, I, J, K and C.

TABLE II

| Node | Frequency | Power Level |
| --- | --- | --- |
| H | 2.4–2.483 GHz | |
| B | 2.4–2.483 GHz | −70 dBm |
| I | 2.4–2.483 GHz | −10 dBm |
| J | 266–276 GHz | |
| E and K | 266–276 GHz | −45 dBm |
| C and L | 266–276 GHz | −10 dBm |
| D and G | 0.01–10 MHz | |

Figure 3:
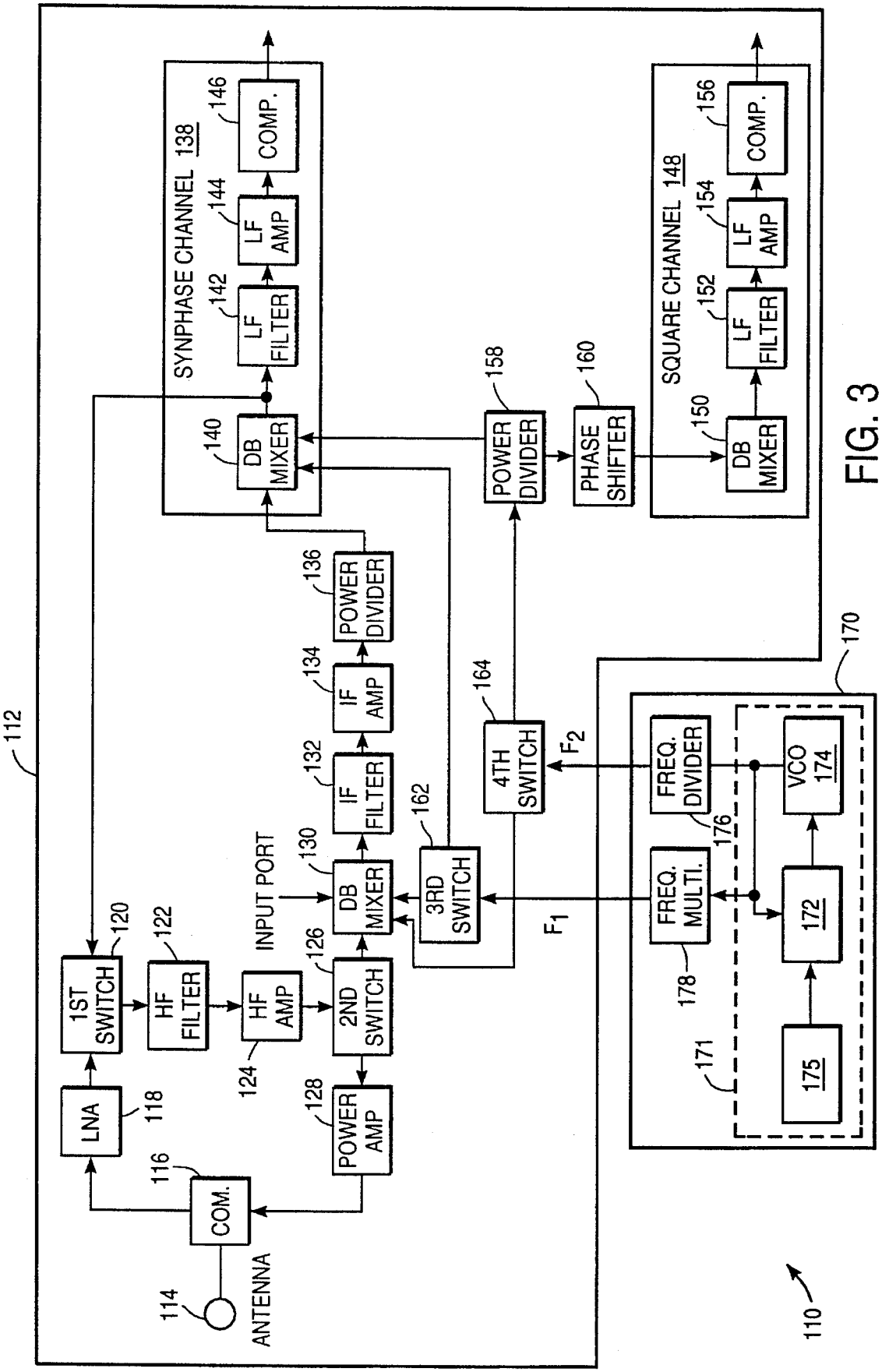
FIG. 3 is a block diagram of a transceiver according to a second embodiment of the present invention.

Referring to FIG. 3, a block diagram of a transceiver 110 according to another embodiment of the present invention is shown. The transceiver 110 includes a transceiver block 112 and a variable frequency generator block (VFG) 170.

The transceiver block 112 includes an antenna 114, communicator 116, LNA 118, first switch 120, UHF filter 122, UHF amplifier 124, second switch 126, power amplifier 128, first DB mixer 130, IF band pass filter 132, IF amplifier 134, power divider 136, Synphase Channel 138 including second DB mixer 140, LP filter 142, LF amplifier 144, and comparator 146, Square Channel 148 including third DB mixer 150, LP filter 152, LF amplifier 154, and comparator 156, power divider 158, phase shifter 160, third switch 162 and fourth switch 164.

The VFG 170 includes PLL 17 1 including a digital frequency synthesizer 172, voltage controlled generator (VCG) 174, and a crystal oscillator 175, frequency divider 176, and frequency multiplier 178. The VFG 170 is responsible for generating the local oscillator (LO) signals required for modulation and the down conversions. This is accomplished by the PLL 17 1 which generates a stable reference frequency. The frequency multiplier 178 doubles the reference frequency to $F_l$. The frequency divider 176 divides the reference frequency by four to create $F_2$.

OPERATION

The transceiver 110 has two modes of operation, receive and transmit. The operation of the various component parts during receive and transmit are described below.

A. Transmit Mode

In the transmit mode, a coded baseband signal is provided directly to the DB mixer 130 through the Input Port (node A). The DB mixer 130 performs the BPSK modulation by mixing the coded baseband signal with $F_2$ (node D). The modulated carrier signal is band pass filtered by IF filter 132 and amplified by IF amplifier 134. The amplified and the filtered IF carrier signal is then provided to the second DB mixer 140 through the power divider 136.

The second DB mixer 140 is responsible for completing the up conversion of the modulated IF signal to the broadcast frequency by mixing the modulated IF carrier signal with $F_1$ (node C). The first switch 120 directs the output of second DB mixer 140 to UHF filter 122 and UHF amplifier 124, where the signal is filtered and amplified. The second switch 126 then directs the modulated, UHF carrier signal to the power amplifier 128 which amplifies the signal to the desired broadcast power level. Thereafter, the carrier signal is broadcast by the antenna 114 through communicator switch 116.

B. Receiving Mode

In the receiving mode, the antenna 114 receives the UHF broadcast signals. The LNA 118 amplifies the UHF signals, and the UHF filter 122 selects a band which contains the desired carrier signal. The UHF amplifier 124 amplifies the selected UHF carrier signal.

The UHF carrier signal is provided to the first DB mixer 130 through second switch 126. The first DB mixer 130 mixes the UHF carrier signal with the $F_1$ (node B), and the subsequent IF filter 132 band pass filters and the IF amplifier 134 amplifies the down-converted IF carrier signal. The power divider 136 divides the filtered and amplified IF carrier signal into two identical signals of reduced power, and provides the two signals to the Synphase Channel 138 and the Square Channel 148 respectively.

In the Synphase Channel 138, the IF carrier signal undergoes a second down conversion by mixing with $F_2$ (node E) at the DB mixer 140. The output of the DB mixer 140 is passed through to the LP filter 142, LF amplifier 144, and the comparator 146. The comparator 146 is responsible for performing BPSK demodulation on the resulting LF carrier signal, thus retrieving the baseband information for the first quadrature signal.

In the Square Channel 148, the IF carrier signal from the power divider 136 is provided to the DB mixer 150 where it is mixed with $F_2$ (node F), which is shifted 90° out of phase by phase shifter 160. The output of the DB mixer 150 is subsequently passed through to the LP filter 152, LF amplifier 154, and the comparator 156. The comparator 156 is responsible for performing B PSK demodulation on the LF carrier signal, thus obtaining the baseband information for the second quadrature signal.

Similar to the embodiment described with relation to FIGS. 1 and 2; the first quadrature signal and the second quadrature signal are then phased compared using the system clock as a phase reference. As a result, the original coded baseband information is retrieved. A subsequent decoder is used to decode the coded baseband signal.

In accordance with best mode of the embodiment shown in FIG. 3 of the present invention, the transceiver 110 is also intended to transmit and receive frequencies in the range of 2.4 GHz to 2.4883 GHz. During operation, the frequencies at various stages of the transceiver 110 during receive and transmit, are similar to those at the corresponding nodes of the transceiver 10 of FIGS. 1 and 2.

While the present invention has been described in relationship to the embodiments described in the accompanying specification, other alternatives, embodiments and modifications will be apparent to those skilled in the art. It is intended that the specification is exemplary, and the true scope and spirit of the invention be indicated by the following claims.

What is claimed is:

1. A radio having an antenna, comprising:
   a reception element configured to receive a reception carrier signal at the antenna;
   a transmission dement configured to transmit from the antenna a transmission carrier signal with a transmission baseband signal modulated thereon; and
   a mixer stage, coupled between the reception element and the transmission element, the mixer stage including a first mixer circuit configured to modulate the transmission baseband signal onto the transmission carrier signal and a second mixer circuit to modulate the transmission carrier signal during transmission of the radio, the first mixer circuit further configured to perform a first down-conversion of the reception carrier signal and to perform a second down-conversion on the reception carrier signal received during reception of the radio.

2. The radio of claim 1, wherein the first mixer circuit is configured to perform the first down-conversion of the reception carrier signal with a first frequency F1 and to perform the second down-conversion of the reception carrier signal with a second frequency F2.

3. The radio of claim 2, further comprising a bandpass filter, coupled to the first mixer circuit, to bandpass the first down-conversion of the reception carrier signal and a lowpass filter, coupled to the first mixer circuit, to lowpass the second down-conversion of the reception carrier signal.

4. The radio of claim 3, wherein the first down-conversion and the second down-conversion of the reception carrier signal are performed at substantially the same time.

5. The radio of claim 1, wherein the first mixer circuit produces a first quadrature signal and the second mixer circuit is configured to produce a second quadrature signal which is derived from the reception carrier signal after the first mixer circuit performs the first down-conversion on the reception carrier signal.

6. The radio of claim 5, further comprising a lowpass filter, coupled to the second mixer, and configured to lowpass the second quadrature signal.

7. The radio of claim 5, wherein the second quadrature signal and the first carrier signal from the first quadrature signal are approximately the same frequency.

8. The radio of claim 7, wherein the first quadrature signal and the second quadrature signal are out of phase.

9. The radio of claim 8, further comprising a random phase filter configured to substantially remove random phase shifts from the first quadrature signal and the second quadrature signal that are introduced during transmission of the reception carrier signal.

10. The radio of claim 9, wherein the random phase filter comprises a phase comparator configured to compare a first baseband signal derived from the first quadrature signal and a second baseband signal derived from the second quadrature signal with respect to a phase reference signal, and to generate a filtered baseband signal in response thereto.

11. The radio of claim 10, further comprising a decoder to decode the filtered baseband signal.

12. A communication system including a first node and a second node, wherein the first node comprises:

a reception element configured to receive a reception carrier signal at an antenna;

a transmission element configured to transmit from the antenna a transmission carrier signal with a transmission baseband signal modulated thereon; and a mixer stage, coupled between the reception element and the transmission element, the mixer stage including a first mixer circuit configured to modulate the transmission baseband signal onto the transmission carrier signal and a second mixer circuit to modulate the transmission carrier signal during transmission at the first node of the communication system, the first mixer circuit further configured to perform a first down-conversion of the reception carrier signal and to perform a second down-conversion on the reception carrier signal received during reception at the first node of the communication system.

13. The communication system of claim 12, wherein the first node receives information from the second node.

14. The communication system of claim 12, wherein the first node is a computer system.

15. The communication system of claim 14, wherein the computer system is mobile.

16. A method of providing a radio having an antenna, comprising the steps of:

providing a reception element configured to receive a reception carrier signal at the antenna;

providing a transmission element configured to transmit from the antenna a transmission carrier signal with a transmission baseband signal modulated thereon; and providing a mixer stage, coupled between the reception element and the transmission element, the mixer stage including a first mixer circuit configured to modulate the transmission baseband signal onto the transmission carrier signal and a second mixer circuit to modulate the transmission carrier signal during transmission of the radio, the first mixer circuit further configured to perform a first down-conversion of the reception carrier signal and to perform a second down-conversion on the reception carrier signal received during reception of the radio.

17. A method of providing a communication system including a first node and a second node, wherein the step of providing the first node comprises the steps of:

providing a reception element configured to receive a reception carrier signal at an antenna;

providing a transmission element configured to transmit from the antenna a transmission carrier signal with a transmission baseband signal modulated thereon; and providing a mixer stage, coupled between the reception element and the transmission element, the mixer stage including a first mixer circuit configured to modulate the transmission baseband signal onto the transmission carrier signal and a second mixer circuit to modulate the transmission carrier signal during transmission at the first node of the communication system, the first mixer circuit further configured to perform a first down-conversion of the reception carrier signal and to perform a second down-conversion on the reception carrier signal received during reception at the first node in the communication system.

18. A method of operating a radio having an antenna, comprising the steps of:

receiving a reception carrier signal at a reception element coupled to the antenna during a first period;

transmitting from the antenna a transmission carrier signal with a transmission baseband signal modulated thereon by a transmission element during a second period;

coupling a mixer element between the reception element and the transmission element, the mixer stage including a first mixer circuit and a second mixer circuit;

using the first mixer circuit to modulate the transmission baseband signal onto the transmission carrier signal during the second period and to perform a first down-conversion and a second down-conversion on the reception carrier signal received during the first period; and using the second mixer circuit to further modulate the transmission baseband signal during the second period.

* * * * *

UNITED STATES PATENT AND TRADEMARK OFFICE
CERTIFICATE OF CORRECTION

PATENT NO.   :   5,590,413
DATED        :   December 31,1996
INVENTOR(S)  :   Kondratiev et al.

It is certified that error appears in the above-identified patent and that said Letters Patent is hereby corrected as shown below:

In claim 1, at line 4, please delete "dement" and insert --element--.

Signed and Sealed this

Fourteenth Day of September, 1999

*Attest:*

Q. TODD DICKINSON

*Attesting Officer*   *Acting Commissioner of Patents and Trademarks*